United States Patent
Kristiansson et al.

(10) Patent No.: US 9,432,408 B2
(45) Date of Patent: Aug. 30, 2016

(54) SIGNALLING GATEWAY, METHOD, COMPUTER PROGRAM AND COMPUTER PROGRAM PRODUCT FOR COMMUNICATION BETWEEN HTTP AND SIP

(75) Inventors: Johan Kristiansson, Luleå (SE); Daniel Enström, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 522 days.

(21) Appl. No.: 13/880,397

(22) PCT Filed: Nov. 3, 2010

(86) PCT No.: PCT/SE2010/051196
§ 371 (c)(1),
(2), (4) Date: Apr. 19, 2013

(87) PCT Pub. No.: WO2012/060747
PCT Pub. Date: May 10, 2012

(65) Prior Publication Data
US 2013/0232217 A1    Sep. 5, 2013

(51) Int. Cl.
*H04L 29/06* (2006.01)
*H04L 29/08* (2006.01)

(52) U.S. Cl.
CPC ......... *H04L 65/1006* (2013.01); *H04L 65/103* (2013.01); *H04L 65/104* (2013.01); *H04L 69/08* (2013.01); *H04L 67/02* (2013.01)

(58) Field of Classification Search
CPC ............... H04L 67/02; H04L 65/1006; H04L 12/2812; H04L 65/4084
USPC ........................................................ 709/213
See application file for complete search history.

(56) References Cited

U.S. PATENT DOCUMENTS

| | | | |
|---|---|---|---|
| 6,934,756 B2 | 8/2005 | Maes | |
| 7,313,134 B2 * | 12/2007 | Yarlagadda | ....... H04L 29/06027 370/352 |
| 7,617,459 B2 | 11/2009 | Ho et al. | |
| 7,664,101 B1 * | 2/2010 | Croak | ..................... H04L 12/66 370/352 |
| 7,739,391 B2 | 6/2010 | Marais et al. | |

(Continued)

FOREIGN PATENT DOCUMENTS

| | | |
|---|---|---|
| WO | WO 2007/106199 A2 | 9/2007 |
| WO | WO 2008/077816 A1 | 7/2008 |

OTHER PUBLICATIONS

Nichols et al., "High-Latency, Low-Bandwidth Windowing in the Jupiter Collaboration System", *Proceedings of UIST* 1995, 10 pages.

(Continued)

*Primary Examiner* — Thomas Dailey
*Assistant Examiner* — Ruth Solomon
(74) *Attorney, Agent, or Firm* — Patent Portfolio Builders, PLLC

(57) ABSTRACT

A signalling gateway is arranged to allow a first client using hypertext transfer protocol, HTTP, to initiate a real-time connection to a SIP, session initiation protocol, client using SIP. The signalling gateway is arranged to use a distributed shared memory to support communication between the first client and the signalling gateway regarding session information of the real-time connection. Corresponding methods, computer programs, and computer program products are also presented.

17 Claims, 6 Drawing Sheets

(56) References Cited

U.S. PATENT DOCUMENTS

| | | | | |
|---|---|---|---|---|
| 7,996,566 B1* | 8/2011 | Sylvain | H04N 7/15 | 709/202 |
| 8,001,250 B2* | 8/2011 | Langen | H04L 29/06 | 709/227 |
| 8,161,171 B2* | 4/2012 | Maes | H04L 65/104 | 709/219 |
| 8,266,203 B2* | 9/2012 | Xu | H04L 67/303 | 370/400 |
| 8,549,151 B2* | 10/2013 | Stokking | H04L 65/104 | 709/227 |
| 8,626,847 B2* | 1/2014 | Jones | H04L 12/1822 | 709/206 |
| 8,923,325 B2* | 12/2014 | Vass | H04L 65/104 | 370/352 |
| 2003/0179753 A1* | 9/2003 | Mercuriali | H04L 29/06 | 370/395.2 |
| 2006/0256771 A1* | 11/2006 | Yarlagadda | H04L 29/06027 | 370/352 |
| 2007/0005763 A1* | 1/2007 | Shaffer | H04L 51/04 | 709/225 |
| 2007/0180135 A1* | 8/2007 | Kenrick | H04L 29/06027 | 709/231 |
| 2008/0069011 A1* | 3/2008 | Sekaran | H04L 12/1813 | 370/260 |
| 2008/0177889 A1* | 7/2008 | Beyer | H04L 65/1016 | 709/230 |
| 2008/0259909 A1* | 10/2008 | Runeson | H04L 65/1006 | 370/352 |
| 2009/0132717 A1* | 5/2009 | Maes | H04L 65/104 | 709/228 |
| 2009/0222858 A1* | 9/2009 | Hjelm | G06F 17/30035 | 725/47 |
| 2010/0114896 A1* | 5/2010 | Clark | H04L 12/66 | 707/741 |
| 2010/0217823 A1* | 8/2010 | Clark | H04M 1/2535 | 709/207 |
| 2010/0238919 A1* | 9/2010 | Froelich | H04L 12/581 | 370/352 |
| 2011/0270933 A1* | 11/2011 | Jones | H04L 12/1822 | 709/206 |

OTHER PUBLICATIONS

International Search Report, PCT Application No. PCT/SE2010/051196, Jun. 30, 2011.

"Comet programming," accessed at http://en.wikipedia.org/wiki/Comet_(programming) accessed on Jul. 10, 2015.

"Operational Transformation," accessed at https://en.wikipedia.org/wiki/Operational_transformation accessed on Jul. 10, 2015.

"The Apache Casandra Project," accessed at http://cassandra.apache.org/ accessed on Jul. 10, 2015.

"WebSocket API," W3C, accessed at http://dev.w3.org/html5/websockets accessed on Jul. 10, 2015.

Chang, F. et al. "Bigtable: A distributed storage system for structured data," OSDI'06: 7th USENIX Symposium on Operating Systems Design and Implementation, 2006, pp. 205-218.

Sun, C. et al. "Achieving Convergence, Causality Preservation, and Intention-Preservation in Real-Time Cooperative Editing Systems," ACM Transactions on Computer-Human Interaction, vol. 5, No. 1, Mar. 1998, pp. 63-108.

Lindström, Distributed Optimistic Concurrency Control for Real-Time Database Systems. 10th International Conference on Real-Time and Embedded Computing Systems and Applications, Aug. 2009, 21 pages.

Saito and Shapiro, Optimistic replication. ACM Computing Surveys (CSUR), vol. 37, No. 1, 2005, pp. 48.

* cited by examiner

30 Players

| 33 Key | 34 IMS adapter | 35 2nd client id | 36 Meeting id | 37 Media encoding |
|---|---|---|---|---|
| x/video | mm tel | sip://john@foo.com | sip://mtg1@bar.com | H.264 |
| x/audio | mm tel | sip://john@foo.com | sip://mtg1@bar.com | AMR-WB |
| ... | ... | ... | ... | |

| 38 player state | 39 Media GW state | 40 Media GW URL |
|---|---|---|
| Connected | Connected | ws://mwgw/1235 |
| Connected | Connected | ws://mwgw/1236 |
| ... | | |

Fig. 4

SIGNALLING GATEWAY, METHOD, COMPUTER PROGRAM AND COMPUTER PROGRAM PRODUCT FOR COMMUNICATION BETWEEN HTTP AND SIP

CROSS REFERENCE TO RELATED APPLICATION

This application is a 35 U.S.C. §371 national stage application of PCT International Application No. PCT/SE2010/051196, filed on 3 Nov. 2010, the disclosure and content of which is incorporated by reference herein in its entirety. The above-referenced PCT International Application was published in the English language as International Publication No. WO 2012/060747 A1 on 10 May 2012.

TECHNICAL FIELD

The invention relates to enabling communication between a client using HTTP (HyperText Transfer Protocol) and a client using SIP (Session Initiation Protocol).

BACKGROUND

Streaming media over IP (Internet Protocol) networks have been used for many years now. However, there are still problems with interconnecting clients of various networks.

For example, it is beneficial if web clients can set up communication with SIP clients. So far there are a number of issues with such communication. One aspect of SIP is that is was designed to operate on, in practice, managed networks. In other words, the design of SIP assumes that it is always possible to discover the routing information needed to route messages to their respective end receivers. The Internet today often does not allow this due to the presence of private networks, which often implies the user of NATs, Network Address Translators, and firewalls.

In the prior art, solutions have been developed to allow clients of the web domain and SIP domain to connect, but these are complicated, intricate and delicate.

SUMMARY

An object of the invention is to provide a gateway, method, computer program and computer program product to allow a first client using HTTP to connect to a SIP client, which is simpler and easier than what is known in the prior art.

A first aspect is a signalling gateway arranged to allow a first client using hypertext transfer protocol, HTTP, to initiate a real-time connection to a SIP, session initiation protocol, client using SIP. The signalling gateway is arranged to use a distributed shared memory to support communication between the first client and the signalling gateway regarding session information of the real-time connection.

By using the distributed shared memory, complicated signalling protocols between the signalling gateway and the first client can be avoided. Session initialisation properties and status of the connection can simply be communicated by storing data in the distributed shared memory by the sending entity, after which the receiving entity detects the changed/added data and acts accordingly.

The signalling gateway may be arranged to use a player data structure of the distributed shared memory to send or receive data regarding active sessions and media players of the first client. In other words, the shared memory can be used to make communication of properties of active sessions and players efficient.

The distributed shared memory may comprise a plurality of player data structures for respective plurality of first clients, and wherein each player data structure has a unique key coupled to its respective first client. In other words, the same distributed shared memory can be used for an entire system with many clients, as long as each HTTP client is uniquely identifiable in the distributed shared memory.

The data regarding active sessions may comprise at least one of the following properties: identifier of the SIP client, conference identifier, media encoding, player state, media gateway state, and media gateway URL.

The distributed shared memory may comprise a users data structure for communicating available SIP clients to the first client. In other words, also user data can be stored in the distributed shared memory to make communication more efficient and simple.

A second aspect is a method for enabling a real-time connection between a first client using hypertext transfer protocol, HTTP, to a SIP, session initiation protocol, client using SIP.

The method comprises the steps, performed in a signalling gateway, of: reading SIP client data from a distributed shared memory, which SIP client data was stored in the distributed shared memory by the first client; initialising communication with the SIP client; and storing an indicator in the distributed shared memory (15), the indicator indicating to the first client that the connection is initialised.

The indicator comprises a pointer to a media gateway for real-time communication between the first client and the SIP client.

The steps of reading and storing may comprise reading and storing data, respectively, in a player data structure of the distributed shared memory, the player data structure indicating active sessions and media players of the first client.

The data regarding active sessions may comprise at least one of the following properties: identifier of the SIP client, conference identifier, media encoding, player state, media gateway state, and media gateway URL.

The step may further comprise the step, prior to the step of reading, of: storing, in a users data structure of the distributed shared memory, available SIP clients, whereby the users data structure is available to the first client.

A third aspect is a computer program for a signalling gateway to enable a real-time connection between a first client using hypertext transfer protocol, HTTP, to a SIP, session initiation protocol, client using SIP. The computer program comprises computer program code which, when run on the signalling gateway, causes the signalling gateway to perform the steps of: reading SIP client data from a distributed shared memory, which SIP client data was stored in the distributed shared memory by the first client; initialise communication with the SIP client; and storing an indicator in the distributed shared memory, the indicator indicating to the first client that the connection is initialised.

A fourth aspect is a computer program product comprising a computer program according to the third aspect and a computer readable means on which the computer program is stored.

It is to be noted that any feature of the first, second, third, and fourth aspects may, where appropriate, be applied to any other of these aspects.

It is to be noted what whenever the term call is used herein, it can refer to a voice call, a video call, a call with both voice and video between two or more parties. A video call is to be construed as referring to any communication comprising images, i.e. either streaming images, or one or a succession of still images.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 is a schematic diagram illustrating a player data structure of the distributed shared memory of FIGS. 1 to 3.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
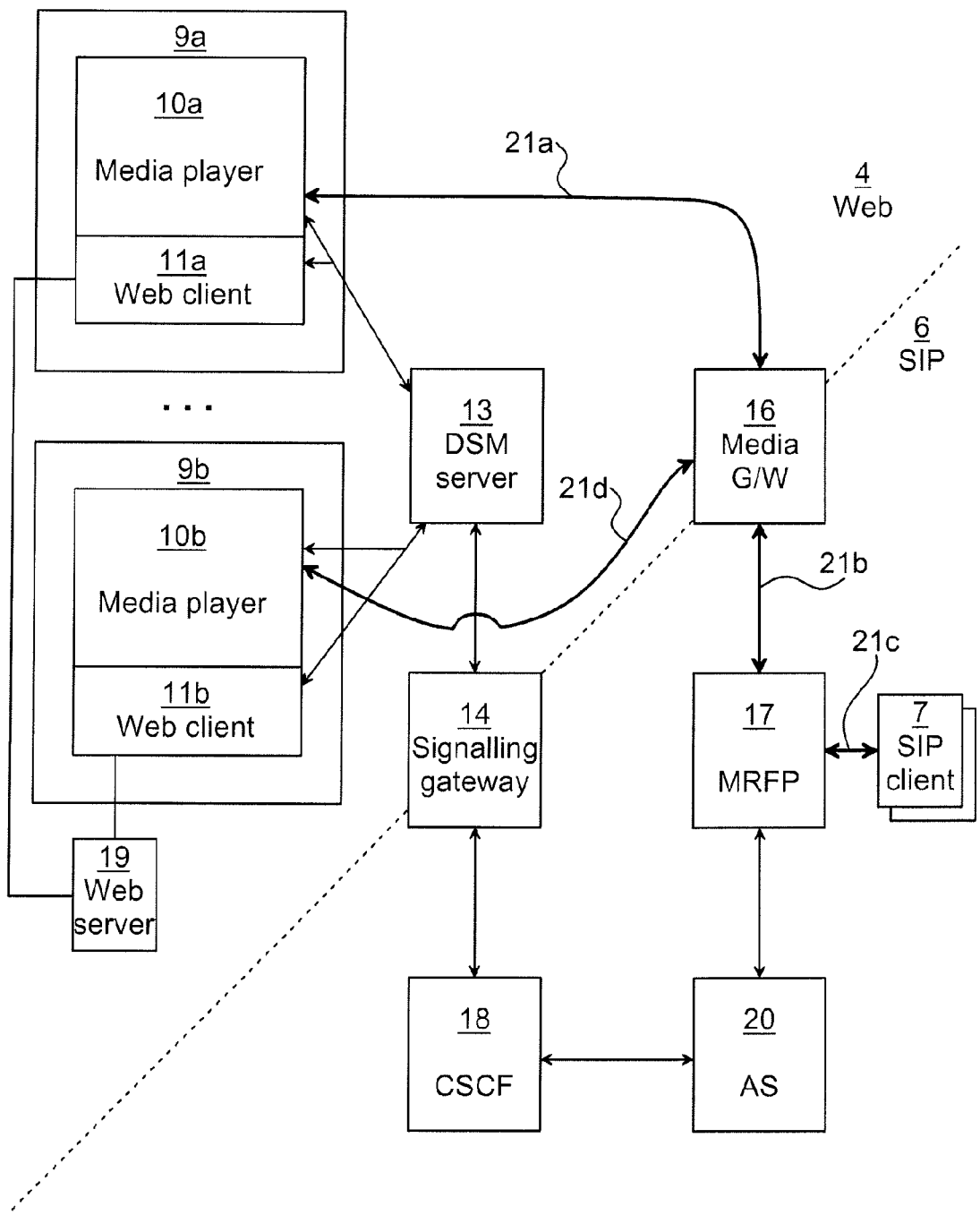
FIG. 1 is a schematic block diagram illustrating the topology of a system where the present invention can be applied.

FIG. 1 is a schematic block diagram illustrating the topology of a system where the present invention can be applied.

A client 9a is user client comprising a web client 11a and a media player 10a. The user of the client 9a would like to set up communication with one or more SIP (Session Initiation Protocol) clients 7. The SIP clients 7 here also represent video or voice conferences. One or more other clients 9b are arranged in the same way as the client 9a, and thus comprise a media player 10b and a web client 11b. A web server 19 providing web pages to the web client 11a, which enables the web client 11a to interact with a DSM (distributed shared memory) of DSM server 13, as is explained in more detail below.

A DSM, as used in the DSM server 13, is a distributed global address space where every memory is assigned a unique address. By knowing this address, it is possible to get a copy or replica of the memory. Any modification to the memory is synchronized so that every replica converges to the same state, potentially after some time. This is known as eventual consistency as it may take time until the system becomes consistent. This consistency model is used in many NoSQL architectures to provide scalability in large scale databases running in data centres. While a DSM can be implemented in many different ways using a wide variety of algorithms, embodiments herein benefit from some specific functionality in order to perform as expected.

In particular, the DSM can be based on Operational Transformation (OT). Operational Transformation is a theoretical framework for optimistic concurrency control allowing clients to work locally on a shared memory replica and then synchronize changes to a main memory instance in the background. Any operation on the local replica is applied immediately without being delayed due to a server request or response. This makes it possible to implement responsive user interfaces (very suitable for web browsers) without having to wait for lock on a central data base.

For example, the Jupiter algorithm as presented in Nichols et al., High-latency, low-bandwidth windowing in the Jupiter collaboration system, Proceedings of the $8^{th}$ annual ACM symposium on User interface and software technology, pp. 111-120, 1995, can be used to implement OT.

Optimistic concurrency control allows the Media Player 10a-b to write to the DSM without having to wait and block the browser's main thread, or having to care about other network issues such as managing different event listeners for incoming data. It just writes to the DSM and wait for the changes to be propagated to all other replica instances, and ultimately some other entity to update the memory. As the DSM takes care of all synchronization issues, it significantly reduces the complexity of the client 9a, making it easy to implement.

The DSM server 13 can comprise one or more nodes to implement the distribution of memory as desired.

The DSM server 13 is in turn in contact with a signalling gateway 14 which acts as a signalling interface between the web domain 4 and the SIP domain 6. As such, the signalling gateway is in contact with a Call Session Control Function (CSCF) 18 which is used to process SIP signalling packets for call management.

The CSCF 18 is in contact with an application server 20, such as an IMS (IP multimedia system) application server, which in turn is in contact with a Media Resource Function Processor (MRFP) 17. The MRFP 17 is a media plane node used to mix, source or process media streams. The MRFP 17 can also manage access right to shared resources. The MRFP is in contact with one or more SIP clients 7, such as IMS terminals or conferences.

The SIP clients 7 can via the MRFP and a media gateway 16 communicate with clients in the web domain 4 e.g. using RTP (real-time protocol). The purpose of the media gateway 16 is to exchange packets with payload data (such as RTP packets) between the web domain 4 and the SIP domain 6. In this way, two-way real-time communication 21a-d is enabled between the http clients 9a-b and the SIP clients 7.

Figure 2:
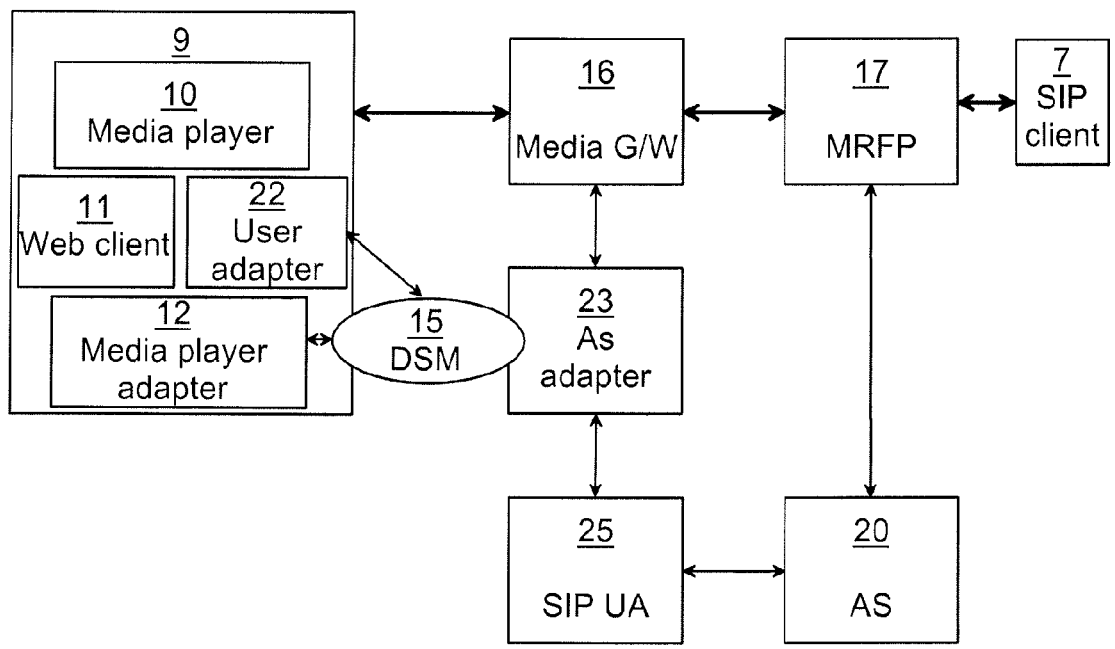
FIG. 2 is a schematic block diagram illustrating functional entities of a system where the present invention can be applied.

FIG. 2 is a schematic block diagram illustrating the functional entities of a system where the present invention can be applied. FIG. 2 shows several adapter components such as a media player adapter 12, the DSM 15 and an application server adapter 23 comprised in the signalling gateway 14 of FIG. 1. The purpose of the components is to connect external components such as DOM (Document Object Model,) objects (e.g. a HTML media player 10) or a call conference session to the DSM 15.

The media player adapter 12 connects a media player component 10, e.g. in the browser to the DSM 15. The media player adapter can either be implemented using any suitable player implementation structure, such as a HTML5 (Hyper- Text Markup Language 5) player DOM object, a NPAPI (Netscape Plugin Application Programming Interface) browser plug-in, or an ActiveX browser plug-in. The media player adapter 12 can either run in the browser or in the external web server 19.

A user adapter 22 represents the user in an SIP system.

The AS adapter 23 connects a SIP conference session to the DSM 15. As the AS adapter 23 shares the same address space as the media player adapter 12 in the DSM 15, they can work together independently of each other in establishing a multimedia session. The AS adapter can be an IMS AS adapter or any other module implementing equivalent functionality.

Optionally, a participation adapter (not shown) is used to keep track of tracks of active users in an SIP conference session.

The idea, in short, is to allow a set of independent adapters to operate on the DSM 15, which represents the current state of a session. Rather than defining a new signalling protocol for communication between different components, it is only necessary to define a common data format and an addressing schema to locate and discover the DSM 15.

As will be explained in more detail below, to set up a session, the web application of the client 9 calls the media player adapter 12 which stores an initial session state in the DSM 15. This will trigger an event to the AS adapter 23 running on the signalling gateway 14, which will do some processing and update the DSM to another state. Typically, the AS 20 sets up a SIP dialog and configures the Web Media GW 16, which the media player 10 running under control of the browser can then use to exchange RTP packets with one or more SIP clients 7.

It is to be noted that the communication between the client 9 and the AS adapter 23 is completely event-driven. For example, the media player adapter 12 stores data in the DSM 15, which will trigger an event that is received by another node accessing the DSM 15, such as the AS adapter 23. All information exchange is thus done by manipulating a data base, which is addressed by a global identifier specified by developers, effectively bypassing complicated protocol structures for this part of the set up process.

Figure 3:
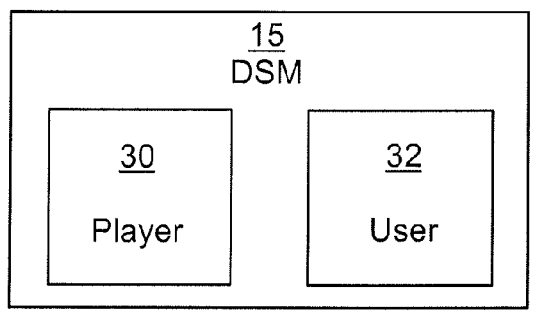
FIG. 3 is a schematic block diagram illustrating components of the distributed shared memory of FIGS. 1 and 2.

FIG. 3 is a schematic block diagram illustrating components of the distributed shared memory of FIGS. 1 and 2. The DSM 15 comprises a players data structure 30 and a users data structure 32.

The players data structure 30 keeps track of active sessions and media players. In this context, a media player can both accept incoming media as well as capture and transmit outgoing media.

The users data structure 32 keeps track of users and conference sessions. It contains information about which conferences (meetings) a particular user has access to as well as participation information. Note that each node in both data structures 30, 32 is part of a globally addressable DSM 15, which means that the data structures are completely distributed and can be accessed by any peer in the system that has access to the DSM system 15.

FIG. 4 is a schematic diagram illustrating the player data structure 30 of the distributed shared memory 15 of FIGS. 2 and 3. While each data object is here shown as a row in a table, this is only done for illustrative purposes and each object can exist as pure objects in a non-relational database. Nevertheless properties 33-40 are here used to illustrate various aspects of objects in the players data structure 30.

A key 33 is used to identify an object. For example, the key can comprise a unique client identifier x and a suffix '/video' or '/audio' to indicate the type of media associated with the object.

An IMS adapter property 34 allows the use of various services when applied to IMS. For example, 'MMTel' denoted IMS Multimedia Telephony and 'PoC' denotes Push to talk over Cellular. If only one service is used all the time, this property can be omitted. Alternatively, if IMS is not used, the property would typically a different name but would still indicate the service to use, if the property is used.

A second client id property 35 indicates the address or identifier of the second client, i.e. the IMS client such as sip://john@foo.com.

A conference id property 36 indicates an identifier of a conference to connect to. For example, the conference id property 36 can contain the SIP address to the conference that the AS adapter should join.

A media encoding property 37 indicates how the media is encoded. A player state property 38 and a media gateway state property 39 indicate the state of the player and media gateway, respectively. These properties can assume any state from the group of connecting, connected, disconnected and failed.

Finally, a gateway URL 40 is used to indicate the URL (Uniform Resource Locator) of the media gateway 16.

Now follows a short description on how the properties are used in practice, with reference to FIGS. 4 and 2. When a client 9 wants to set up a call or join a video conference session, it calls the media player adapter 12, which determines a new DSM address based on a unique key (x) in the web page provided by the web server 19, e.g. embedded in generated javascript. To be able to handle multiple media (e.g. both voice and video) the client 9 appends another identifier to the address, for example '/video'. The media player adapter 12 then creates a new DSM object based on the calculated key.

The media player adapter 12 then adds some properties to the DSM 15 for setting up a session, for example media encoding 37 and SIP URIs 35, 36 to the SIP system. The media player adapter 12 also specifies an IMS Adapter name 34 (for example mmtel), and sets the property called player state 38 to connecting, indicating that it wants to connect the media player 10 to a remote conference session or another peer 7. The media player adapter 12 then adds a listener to the DSM 15 that is automatically called when a property called media gateway URL 40 is added (or updated) to the object in the DSM 15. When the media gateway URL 40 property is determined, the media player component 10 can connect to the media gateway 16, which enables real-time communication.

The media player adapter 12 then adds a reference (i.e. the DSM object address) of the created DSM object to the players data structure 30 in the DSM 15. This is needed to let the application server adapter 23 of the signalling gateway 14 detect that a new media player adapter has been created.

Figure 5:
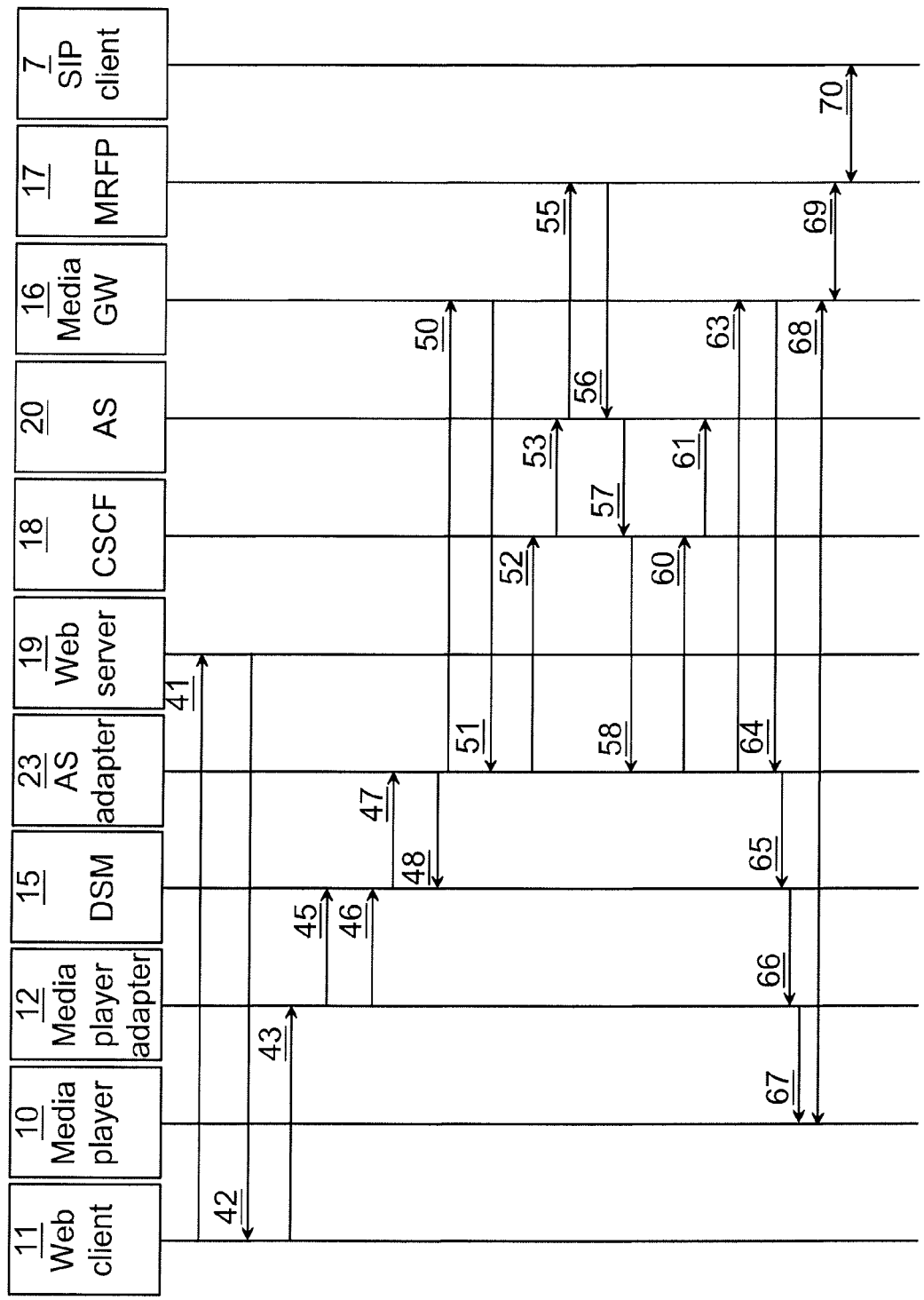
FIG. 5 is a sequence diagram illustrating setting up a real-time connection in the system of FIGS. 1-2.

FIG. 5 is a sequence diagram illustrating setting up a real-time connection in the system of FIGS. 1-2. While the sequence diagram illustrates the set up for one client, it can of course be repeated or performed in parallel for any desired number of clients, as long as there is sufficient capacity.

The web client 11 sends an HTTP (HyperText Transfer Protocol) GET command 41 to the web server 19 to receive links to SIP clients 7 such as conferences or users to connect to. The web server responds 42 with generated HTML, optionally using CSS (Cascading StyleSheets) and JavaScript, or equivalent, for client side processing. Optionally, the response from the web server 19 embeds the unique key to be used to distinguish the session in the DSM 15 later. The reason that the server generates the key is to ensure that the keys for different clients are unique. An alternative solution is to let the browser clients generate a hash value themselves without server interference, for example using MD5 (Message-Digest algorithm 5). However, the DSM addresses would become larger and more bandwidth would be consumed when synchronizing different DSM replicas.

The user interacts with the web client 11 to select a SIP client 7 to connect to, whereby the web client sends a command 43 to the media player adapter 12 to set up communication. The media player adapter 12 creates 45 an object in the DSM 15, stores data in properties to allow call setup and commits 46 the changes. The AS adapter 23 has an event listener for new objects in the DSM, whereby an event 47 is triggered to notify the AS adapter 23 of the new object.

The AS adapter 23 reads 48 the object from the DSM and sends an HTTP add local termination command 50 to the media gateway 16. The media gateway 16 processes the command from the AS adapter 23 and responds with HTTP port information 51 to the AS adapter 23.

The AS adapter sends an SIP INVITE command 52 to the CSCF 18 which sends an SIP INVITE command 55 to the application server 20. The application server 20 then sends a H.248 add termination command to the MRFP 17 which responds with SDP (Session Description Protocol) data 56 to the application server 20. The application server 20, in turn, sends a SIP OK command 57 to the CSCF 18 which sends a SIP OK command 58 to the AS adapter 23. The AS adapter 23 responds to the CSCF 18 with a SIP ACK message 60, after which the CSCF 18 sends a SIP ACK message 61 to the application server 20.

The AS adapter 23 can then send an HTTP add remote termination command 63 to the media gateway 16 which responds with an HTTP gateway URL 64. This allows the AS adapter to store the gateway URL property in the previously read DSM object in the DSM 15 and commit 65 the change. Since the media player adapter 12 listens to any changes to the gateway URL property, an event 66 will be triggered from the DSM to the media player adapter 12.

The media player adapter 12 can then configure 67 the media player 10 for real-time communication, after which the media player 10 can set up real-time two-way communication to the media gateway 16, e.g. RTP over WebSocket or HTTP, or alternatively using STUN (Session Traversal Utilities for NAT) or ICE (Interactive Connectivity Establishment) to allow real time communication over NATs (Network Address Translators). The media gateway 69 sets up real-time two-way communication 69 with the MRFP 17, e.g. using RTP over UDP (User Datagram Protocol). The MRFP 17 in turn, sets up real-time two-way communication 70, e.g. using RTP over UDP, with the SIP client 7. In this way, real-time two-way communication between the media player 10 of the client 9 and the SIP client 7 has been set up.

Figure 6:
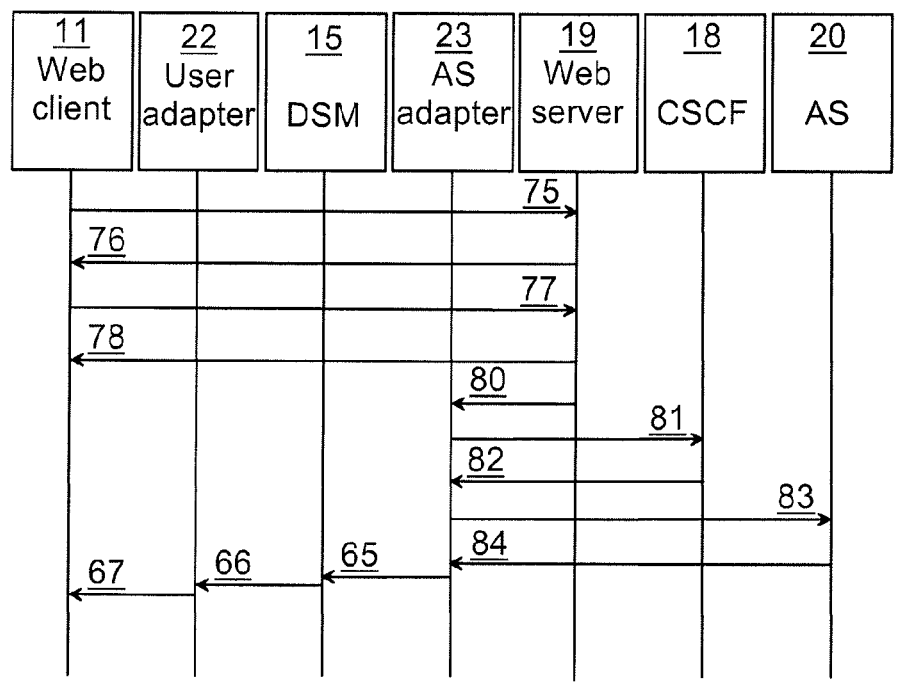
FIG. 6 is a sequence diagram illustrating getting conference information.

FIG. 6 is a sequence diagram illustrating getting conference information. The web client 11 sends an HTTP GET command 77 to receive conferences. Included in the HTTP GET command 77 are credentials for the user of the web client 11, such as SIP user name. The web server responds 78 with generated HTML, optionally using CSS (Cascading StyleSheets) and JavaScript, or equivalent, for client side processing. A unique key is either included in the response 78 or generated by the web client 11.

Furthermore, the web server 19 sends an HTTP register SIP user name command 80 to the AS adapter 23. The AS adapter 23 then sends a SIP register command 81 to the CSCF 18 for the user of the web client 11, after which the CSCF 18 responds with a SIP OK 82 when the user is registered. The AS adapter 23 also sends a SIP subscribe command 83 to the application server 20.

In this way, when any relevant updates are made, e.g. to participant lists of conferences subscribed to, the application server 20 sends a SIP notify command 84 to the AS adapter 23, whereby the AS adapter 23 stores and commits 85 the change in the users data structure 32 of the DSM 15. The user adapter 22 of the client 9 is registered to listen to such changes in the DSM 15, whereby an event 86 is triggered to the user adapter 22. The user adapter 22 then effects a change in the web client, e.g. an updated participant list in the browser window.

Figure 7:
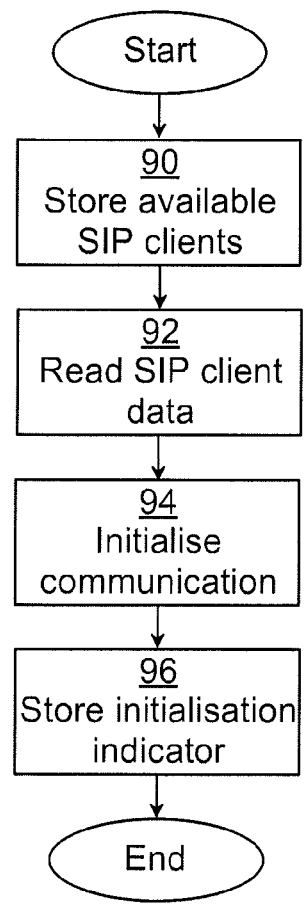
FIG. 7 is a flow chart illustrating a method corresponding to FIG. 5, executed in the signalling gateway of FIGS. 1-2.

FIG. 7 is a flow chart illustrating a method corresponding to FIG. 5, executed in the signalling gateway 14 of FIGS. 1-2, corresponding to communication in the sequence diagrams of FIGS. 5-6 relating to the signalling gateway 14.

In a first store available SIP clients step 90, the steps of the AS adapter 23 of FIG. 6 are executed to store available SIP clients in the users data structure 32 of the distributed shared memory 15. This allows the users data structure 32 to be available to the client 9.

In a read SIP client data step 92, the signalling gateway 14 reads SIP client data from the DSM 15. This SIP client data was previously stored in the DSM 15 by the client 9, indicating the SIP client 7 that the client 9 wants to connect to, as explained above.

In an initialise communication step 94, the signalling gateway 14 sets up communication using appropriate elements as explained with reference to FIG. 5 above. This substantially corresponds to the HTTP add local termination command 50, SIP INVITE command 52, SIP ACK command 60 and HTTP add remote termination command 63.

Once the communication is initialised, the signalling gateway stores an initialisation indicator in the DSM 15, such as a pointer to the media gateway, e.g. the media gateway URL. In this way, the client 9 knows that the communication is initialised and any necessary properties can be read from the players data structure 30 in the DSM 15.

Figure 8:
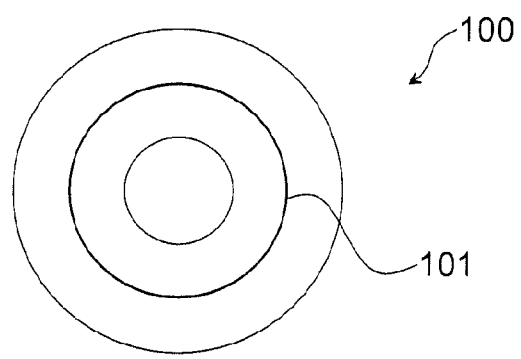
FIG. 8 shows one example of a computer program product 100 comprising computer readable means.

FIG. 8 shows one example of a computer program product 100 comprising computer readable means. On this computer readable means a computer program 101 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of the signalling gateway 14. While the computer program 101 is here schematically shown as a track on the depicted optical disk, the computer program can be stored in any way which is suitable for the computer program product.

While embodiments herein mainly deal with setting up communication, other parts of session management can also be implemented using the DSM 15, such as disconnection, adding or removing parties, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A system arranged to allow a first client using hypertext transfer protocol (HTTP) to initiate a real-time connection to a session initiation protocol (SIP) client using SIP, the system comprising:
 a signalling gateway;
 a distributed shared memory; and
 a user device comprising the first client configured to create a first object in the distributed shared memory and store SIP client data in the first object, resulting in triggering of an event;

wherein the signalling gateway, in response to the event, initializes communication with the SIP client to obtain an indicator and stores the indicator in the first object created by the first client in the distributed shared memory, wherein the indicator indicates to the first client that the real-time connection to the SIP client is initialized;

wherein in response to the event:
a media player of the first client sets up a communication with a media gateway, using Real-Time Protocol (RTP) over HTTP;
the media gateway sets up a communication with a Media Resource Function Processor (MRFP), using RTP over User Datagram Protocol (UDP); and
the MRFP sets up a communication with the SIP client, using RTP over UDP.

2. The system according to claim 1, wherein the signalling gateway is arranged to use a player data structure of the distributed shared memory to send or receive data regarding active sessions and media players of the first client.

3. The system according to claim 2, wherein the distributed shared memory comprises a plurality of player data structures for a respective plurality of first clients, and wherein each player data structure has a unique key coupled to its respective first client.

4. The system according to claim 2, wherein the data regarding active sessions comprises at least one of the following properties: identifier of the SIP client, conference identifier, media encoding, player state, media gateway state, and media gateway Uniform Resource Locator (URL).

5. The system according to claim 1, wherein the distributed shared memory comprises a data structure for communicating available SIP clients to the first client.

6. A method performed in a signalling gateway for enabling a real-time connection between a first client using hypertext transfer protocol (HTTP) to a session initiation protocol (SIP) client using SIP, the method comprising:
creating, by the first client, a first object in a distributed shared memory and storing SIP client data in the first object, resulting in triggering of an event;
obtaining an indicator, in response to the event, by initializing communication with the SIP client; and
storing the indicator in the first object created by the first client in the distributed shared memory, the indicator indicating to the first client that the real-time connection to the SIP client is initialized,
wherein the initialization of the real-time connection from the first client to the SIP client comprises:
setting up a communication between a media player of the first client and a media gateway, using Real-Time Protocol (RTP) over HTTP;
setting up a communication between the media gateway and a Media Resource Function Processor (MRFP), using RTP over User Datagram Protocol (UDP); and
setting up a communication between the MRFP and the SIP client, using RTP over UDP.

7. The method according to claim 6, wherein the indicator comprises a pointer to the media gateway for real-time communication between the first client and the SIP client.

8. The method according to claim 6, wherein storing the SIP client data and storing the indicator comprises storing respective data in a player data structure of the distributed shared memory, the player data structure indicating active sessions and media players of the first client.

9. The method according to claim 8, wherein the data regarding active sessions comprises at least one of the following properties: identifier of the SIP client, conference identifier, media encoding, player state, media gateway state, and media gateway Uniform Resource Locator (URL).

10. The method according to claim 6, further comprising:
before creating, storing, in a data structure of the distributed shared memory, available SIP clients, whereby the data structure is available to the first client.

11. The system according to claim 1, wherein the indicator comprises a pointer to the media gateway for real-time communication between the first client and the SIP client.

12. A system arranged to allow a first client using hypertext transfer protocol (HTTP) to initiate a real-time connection to a session initiation protocol (SIP) client using SIP, the system comprising:
a signalling gateway comprising an application server adapter;
a distributed shared memory;
a media gateway; and
a user device comprising the first client and a media player adapter, wherein the media player adapter creates an object in the distributed shared memory, when the first client initiates setting up a session with the SIP client, and further wherein the media player adapter stores data associated with the SIP client and a session state in the created object, resulting in triggering of a first event to the application server adapter;
wherein the application server adapter, in response to the first event, exchanges one or more commands with the media gateway to receive an indicator;
the application server adapter stores the indicator in the object created by the first client in the distributed shared memory and updates the session state in the created object, resulting in triggering of a second event from the distributed shared memory to the media player adapter;
wherein the first client, in response to the second event, establishes a real-time two-way communication with the SIP client through the media gateway,
wherein in response to the second event:
a media player of the first client sets up a communication with the media gateway, using Real-Time Protocol (RTP) over HTTP;
the media gateway sets up a communication with a Media Resource Function Processor (MRFP), using RTP over User Datagram Protocol (UDP); and
the MRFP sets up a communication with the SIP client, using RTP over UDP.

13. The system according to claim 12, wherein the indicator comprises a pointer to the media gateway for real-time communication between the first client and the SIP client.

14. The system according to claim 12, wherein the object is created in a player data structure of the distributed shared memory, the player data structure indicating active sessions and media players of the first client.

15. The system according to claim 12, wherein the distributed shared memory comprises a plurality of player data structures for a respective plurality of first clients, and wherein each player data structure has a unique key coupled to its respective first client.

16. The system according to claim 14, wherein the data regarding active sessions comprises at least one of the following properties: identifier of the SIP client, conference identifier, media encoding, player state, media gateway state, and media gateway Uniform Resource Locator (URL).

17. The system according to claim 12, wherein the distributed shared memory comprises a data structure for communicating available SIP clients to the first client.

* * * * *